(12) United States Patent
Guo et al.

(10) Patent No.: US 11,904,746 B2
(45) Date of Patent: Feb. 20, 2024

(54) PLASTIC SEATING FRAME FOR ELECTRICAL VEHICLE

(71) Applicant: SABIC GLOBAL TECHNOLOGIES B.V., Bergen op Zoom (NL)

(72) Inventors: Chuangqi Guo, Geleen (NL); Geert-Jan Schellekens, Geleen (NL); Zhongcai Tong, Geleen (NL); Zhen Yu Xie, Geleen (NL); Zhi Tian, Geleen (NL); Tianhua Ding, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 165 days.

(21) Appl. No.: 17/419,471

(22) PCT Filed: Dec. 6, 2019

(86) PCT No.: PCT/EP2019/083942
§ 371 (c)(1),
(2) Date: Jun. 29, 2021

(87) PCT Pub. No.: WO2020/135994
PCT Pub. Date: Jul. 2, 2020

(65) Prior Publication Data
US 2022/0118894 A1    Apr. 21, 2022

(30) Foreign Application Priority Data
Dec. 29, 2018    (CN) .................... 2018116326837.7

(51) Int. Cl.
*B60N 2/68*    (2006.01)
*B60N 2/803*    (2018.01)
(Continued)

(52) U.S. Cl.
CPC .......... *B60N 2/682* (2013.01); *B29C 45/0001* (2013.01); *B29C 45/0005* (2013.01);
(Continued)

(58) Field of Classification Search
CPC ...................................................... B60N 2/686
See application file for complete search history.

(56) References Cited

U.S. PATENT DOCUMENTS

| 2005/0231019 A1* | 10/2005 | Gryp | A47C 7/40 297/452.18 |
| 2008/0018161 A1* | 1/2008 | Evans | B60N 2/686 297/440.14 |

(Continued)

FOREIGN PATENT DOCUMENTS

| DE | 102009040902 A1 * | 3/2011 | ............. B60R 5/006 |
| DE | 102011087054 A1 * | 5/2013 | ........... B60N 2/4249 |

(Continued)

OTHER PUBLICATIONS

International Search Report; International Application No. PCT/EP2019/083942; International Filing Date: Dec. 6, 2019; dated Feb. 13, 2020; 12 pages.

(Continued)

*Primary Examiner* — Timothy J Brindley
(74) *Attorney, Agent, or Firm* — CANTOR COLBURN LLP

(57) ABSTRACT

The invention relates to a seating frame for a vehicle seat, the frame comprising a back frame component for supporting a back rest, wherein the back frame component includes a plurality of interconnected reinforcing ribs that form a single unit, and wherein the seating frame is a one-piece injection-molded part made of plastic material. The invention also relates to a process of making such a seating frame. Furthermore, the invention relates to a vehicle seat comprising such a seating frame, and a vehicle comprising such a vehicle seat or such a seating frame.

19 Claims, 2 Drawing Sheets

(51) Int. Cl.
 *B29C 45/00* (2006.01)
 *B60N 2/66* (2006.01)
 B29K 23/00 (2006.01)
 B29K 309/08 (2006.01)
 B29L 31/00 (2006.01)

(52) U.S. Cl.
 CPC ............. *B60N 2/66* (2013.01); *B60N 2/686* (2013.01); *B60N 2/803* (2018.02); *B29K 2023/12* (2013.01); *B29K 2309/08* (2013.01); *B29L 2031/771* (2013.01)

(56) References Cited

U.S. PATENT DOCUMENTS

| 2014/0178652 | A1* | 6/2014 | Gross | B60N 2/7011 428/196 |
|---|---|---|---|---|
| 2017/0028888 | A1* | 2/2017 | Seibold | B60N 2/6671 |
| 2017/0267147 | A1* | 9/2017 | Line | B60N 2/686 |
| 2017/0368973 | A1* | 12/2017 | Seo | B60N 2/686 |
| 2018/0126885 | A1* | 5/2018 | Hartmann | B60N 2/686 |
| 2018/0170217 | A1* | 6/2018 | Galbreath | B60N 2/99 |

FOREIGN PATENT DOCUMENTS

| DE | 102015113507 | A1 * | 2/2017 | |
| DE | 102016008073 | A1 | 1/2018 | |
| DE | 102016217952 | A1 * | 3/2018 | ............... B60N 2/32 |
| DE | 102018217544 | A1 * | 4/2020 | |
| EP | 2233352 | A1 * | 9/2010 | ......... B29C 45/1704 |
| EP | 2873556 | A1 * | 5/2015 | ............... B60N 2/16 |
| WO | WO-2012032189 | A1 * | 3/2012 | ............... B29C 45/14 |
| WO | WO-2019098743 | A1 * | 5/2019 | ............... B60N 2/58 |

OTHER PUBLICATIONS

Written Opinion; International Application No. PCT/EP2019/083942; International Filing Date: Dec. 6, 2019; dated Feb. 13, 2020; 12 pages.

* cited by examiner

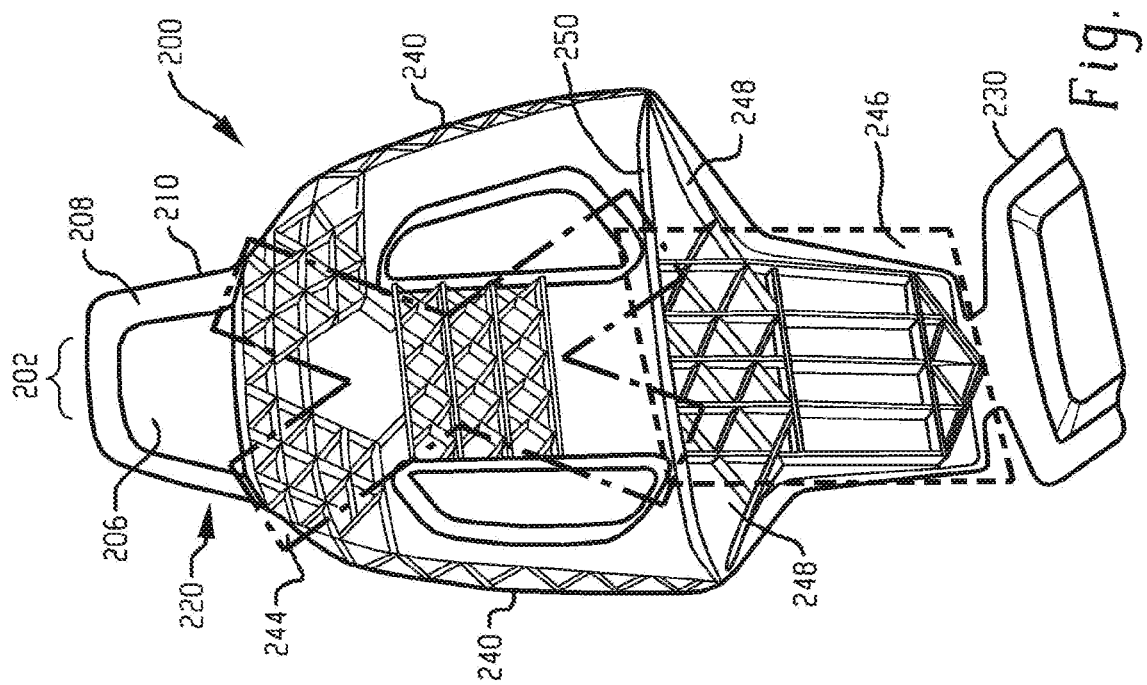
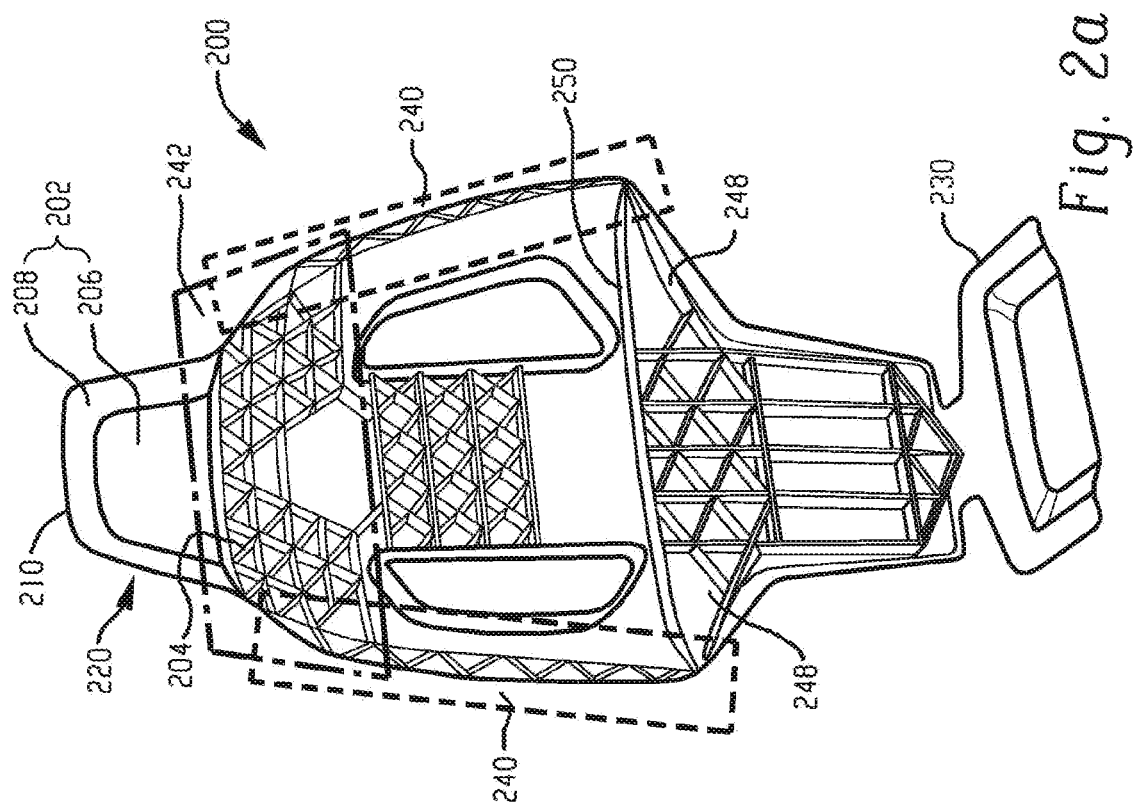

PLASTIC SEATING FRAME FOR ELECTRICAL VEHICLE

CROSS REFERENCE TO RELATED APPLICATIONS

This application is a National Stage application of PCT/EP2019/083942, filed Dec. 6, 2019, which claims the benefit of Chinese Application No. 2018116326837.7, filed Dec. 29, 2018, both of which are incorporated by reference in their entirety herein.

FIELD OF INVENTION

The present invention relates to a seating frame for a vehicle seat, in particular for an electric vehicle, and associated methods for making the same. The invention further relates to such a vehicle seat and a vehicle comprising such a seating frame or vehicle seat.

BACKGROUND

Many motor vehicles now rely on an electric motor for propulsion. Such vehicles include hybrid-electric vehicles (including light hybrids), fully electric, fuel cell powered vehicles and gas-electric hybrid cars (together, "electric vehicles"), and denotes a vehicle that derives at least some of its power from a battery source. Electric vehicles development faces critical challenges all over the world: expensive batteries; inadequate driving range (energy density); long charging times for public infrastructure. To resolve those, weight reduction is one of important methods.

Conventionally, automotive seating frames are made from metal tubes and sheets that are generally formed by bending, piercing, drawing and welding. These operations, however, require several successive operations performed at different workstations, which complicates manufacture and necessitates transfers from one workstation to the next. This also creates a large amount of waste in the raw materials used, and in the tube and sheet metal offcuts.

And as formed of multiple stamped steel parts, those seats have the undesirable features of heavy weight, susceptibility to corrosion and a complicated assembly that can include welding. There is a need in the art for seats that overcome these shortcomings and meet high mechanical performance requirements such as stiffness and strength.

SUMMARY

The aim of the present invention is to solve these problems, and more particularly to replace the traditionally known seating frames by frames based on plastic material, preferably long glass fiber reinforced thermoplastic material, such to reduce weight and cost, to reduce the number of parts, and facilitating integration of the various functions that might be desired.

The present inventors have recognized, among other things, that a problem to be solved can include lowering vehicle weight and through that increasing battery efficiency for an electric vehicle. The present invention provides a seating frame for a vehicle seat, the frame comprising a back frame component for supporting a back rest, wherein the back frame component includes a plurality of reinforcing ribs that form a single unit with the back frame component, and wherein the seating frame is a one-piece injection-molded part made of plastic material.

A seating frame is denoted as an article designed and adapted for holding a passenger or plurality of passengers within a vehicle such as an electrical vehicle. The seating frame, and in particular the back frame component, may be a load-bearing frame that can be fixed to the floor of a vehicle upon installation.

The ribs can be parallel ribs, or radiate from an opening in the frame, or form a network of interconnected ribs. The seating frame may further comprise a seat frame component for supporting a seat base. The seating frame may only consist of a back frame component. The seating frame may be made as a single unit, being an injection molded plastic part. The seating frame may further comprise a fastening component from which the back frame component extends in an upwards fashion, wherein the fastening component is used to fasten the vehicle seat to a vehicle upon installation. The seat base may be supported by and/or fastened to the fastening component. The seat base may be supported by other means than a frame, such as the fastening component.

The frame component may be formed as an individual self-supporting network of interconnected ribs, wherein the interconnected reinforcing ribs define cavities within the back frame component. The network of ribs may be enclosed by a peripheral rib to add to the strength and/or rigidity of the self-supporting network. Alternatively, and preferably, the frame component comprises a base from which the reinforcing ribs extend, wherein the base forms a back of the vehicle seat. The base may comprise a first portion and a peripheral second portion, wherein the peripheral second portion extends at an angle greater than 0 degrees from the periphery of the first portion, preferably between greater than 0 degrees and less than 180 degrees, for instance more than 90 degrees.

The seating frame may further comprise a head rest frame for a head rest, wherein the back frame component comprises a lumbar supporting portion and is attached to the head rest portion, and wherein the back frame portion is attached to the seat frame component.

The back frame component may be a frame component extending from the seat frame component to the head rest frame, thus fully supporting the back of a sitting person. The back frame component may extend from the seat frame portion and include a lumbar supporting portion, and the seating frame may or may not include a head rest portion.

The seating fame is made from a plastic material. The seating frame may be free from metal. Specific non-limiting examples of suitable plastic materials are thermoplastic resins including polyacetal, polyacrylic, styrene acrylonitrile, acrylonitrile-butadiene-styrene (ABS), polycarbonate, polystyrene, polyethylene, polyphenylene ether, polypropylene, polyethylene terephthalate, polybutylene terephthalate, Nylons (Nylon-6, Nylon-6/6, Nylon-6/10, Nylon-6/12, Nylon-11 or Nylon-12, for example), polyamideimide, polyarylate, polyurethane, ethylene propylene diene rubber (EPR), ethylene propylene diene monomer (EPDM), polyarylsulfone, polyethersulfone, polyphenylene sulfide, polyvinyl chloride, polysulfone, polyetherimide, polytetrafluoroethylene, fluorinated ethylene propylene, perfluoroalkoxyethylene, polychlorotrifluoroethylene, polyvinylidene fluoride, polyvinyl fluoride, polyetherketone, polyether ether ketone (PEEK), liquid crystal polymers and mixtures comprising any one of the foregoing thermoplastics. The plastic material may be a fiber filled or fiber reinforced plastic resin. Suitable fibers may be synthetic fibers such as glass fibers, carbon fibers, ceramic fibers, aramid fibers, or thermoplastic fibers, but also natural fibers, such as cotton, wool and silk. Natural fibers come from natural sources such as animals and plants. The natural fibers are vegetable or animal in origin.

The plastic material may comprise a thermoplastic material filled with fibers, preferably, long glass fiber filled polypropylene (LGF-PP). Preferably, the plastic material comprises:

about 55 wt % to about 90 wt % polypropylene;
about 10 wt % to about 40 wt % long glass fiber; and
about 0.0001 wt % to about 5 wt % of one or more of impact modifier, filler, antioxidant and reinforcing agent;
said wt % values based on the weight of the frame component.

Any polypropylene is suitable for use in the component seating frame. For example, the polypropylene can be a propylene homopolymer, a propylene-alpha olefin random copolymer, such as a propylene-ethylene random copolymer, impact propylene copolymers, sometimes referred to as heterophasic propylene copolymers, propylene block-copolymers.

Long fibers are known to those skilled in the art and are commercially available. Fibers can be any size and shape suitable for use in the component seating frame. Long fibers are defined as including fibers with an initial length of greater than or equal to 3 mm. Initial lengths can be up to several centimeters, such as up to 40 mm. The thermoplastic material may comprise long glass fibers and wherein the long glass fibers have a length of about 3 mm to about 40 mm. In some examples, the fibers preferably having a length of from about 3 to about 30 mm such as from about 5 to about 20 mm, from about 10 to about 18 mm and about 3 to about 5 mm. Certain fibers have a diameter of about 10 to about 30 μm, such as 15 to 25 μm. Other fiber types are contemplated as well. Other fibers suitable for use in the disclosure include glass fibers, carbon fibers, graphite fibers, synthetic organic fibers, particularly high modulus organic fibers such as para- and meta-aramid fibers, nylon fibers, polyester fibers, or any of the thermoplastic resins mentioned above that are suitable for use as fibers, natural fibers such as hemp, sisal, jute, flax, coir, kenaf and cellulosic fibers, mineral fibers such as basalt, mineral wool (e.g., rock or slag wool), Wollastonite, alumina silica, and the like, or mixtures thereof, metal fibers, metalized natural and/or synthetic fibers, ceramic fibers, or mixtures thereof.

One commercial source of long-glass fiber-reinforced polypropylene is SABIC's STAMAX™ plastic. STAMAX is sold commercially with 20 to 60 wt % glass fiber content. Commercial products include those with 20, 30, 40, 50 and 60 wt % glass fiber content.

The thermoplastic material, preferably polypropylene, can further contain additives and/or stabilizers like antioxidants, UV stabilizers, flame retardants, pigments, dyes, and adhesion promoters like modified polypropylene, in particular maleated polypropylene, antistatic agents, mold release agents, nucleating agents and the like.

In addition, the polypropylene can contain further reinforcing additives like inorganic reinforcing agents such as talc, short glass fibers and glass, or organic reinforcing agents such as aramid fibers, polyester fibers, and carbon fibers.

The invention also relates to a process of making a seating frame. Any suitable method for forming the component seating frame can be utilized. Certain methods involve injection molding. Such techniques are well-known to those skilled in the art. The method related to the invention includes: introducing a fiber-filled polypropylene to a hopper of an injection molding machine; melting the fiber-filled polymeric material to form a melt in a plasticizing unit; pressurizing the plasticizing unit of the injection molding machine with a blowing agent; dissolving the blowing agent into the melt; injecting the melt into a mold cavity up to 100% of volume; and forming the electric vehicle seating frame with the back frame and the cushion frame simultaneously, wherein said seating frame is configured to be a stressed member of the chassis of an electrical vehicle.

Any suitable method for forming the component seating frame can be utilized. Certain methods involve injection molding. Such techniques are well-known to those skilled in the art.

One process for making a component seating frame includes (i) introducing a fiber-filled polypropylene, such as a glass fiber-filled polypropylene, to a hopper of an injection molding machine; (ii) melting the fiber-filled polypropylene material to form a melt in a plasticizing unit; (iii) pressurizing the plasticizing unit of the injection molding machine with a blowing agent; (iv) dissolving the blowing agent into the melt; (v) injecting the melt into a mold cavity up to 100% of volume; and (vi) forming the component seating frame.

Any suitable blowing agent can be used. In some examples, the blowing agent can be a gaseous blowing agent. Gaseous blowing agent can be at least one of nitrogen gas, oxygen gas, carbon dioxide gas, and a combination including at least one of the foregoing.

The invention further relates to a vehicle seat comprising the seating frame as described above. Preferably, the vehicle seat is a bucket seat.

The invention moreover relates to a vehicle comprising a seating frame or a seat as described above. Preferably, the vehicle is an electric vehicle, more preferably a low-speed electric vehicle.

BRIEF DESCRIPTION OF THE DRAWINGS

The accompanying drawings are incorporated in and constitute a part of this specification, illustrate examples of the disclosure and together with the detailed description serve to explain the principles of the disclosure. No attempt is made to show structural details of the disclosure in more detail than can be necessary for a fundamental understanding of the disclosure and the various ways in which it can be practiced. In the drawings:

FIG. 1b shows a back seat of the vehicle seat of FIG. 1a.

FIGS. 2a and 2b shows a seating frame according to the invention, indicating several regions of a ribbing network.

DETAILED DESCRIPTION

Figure 1B:
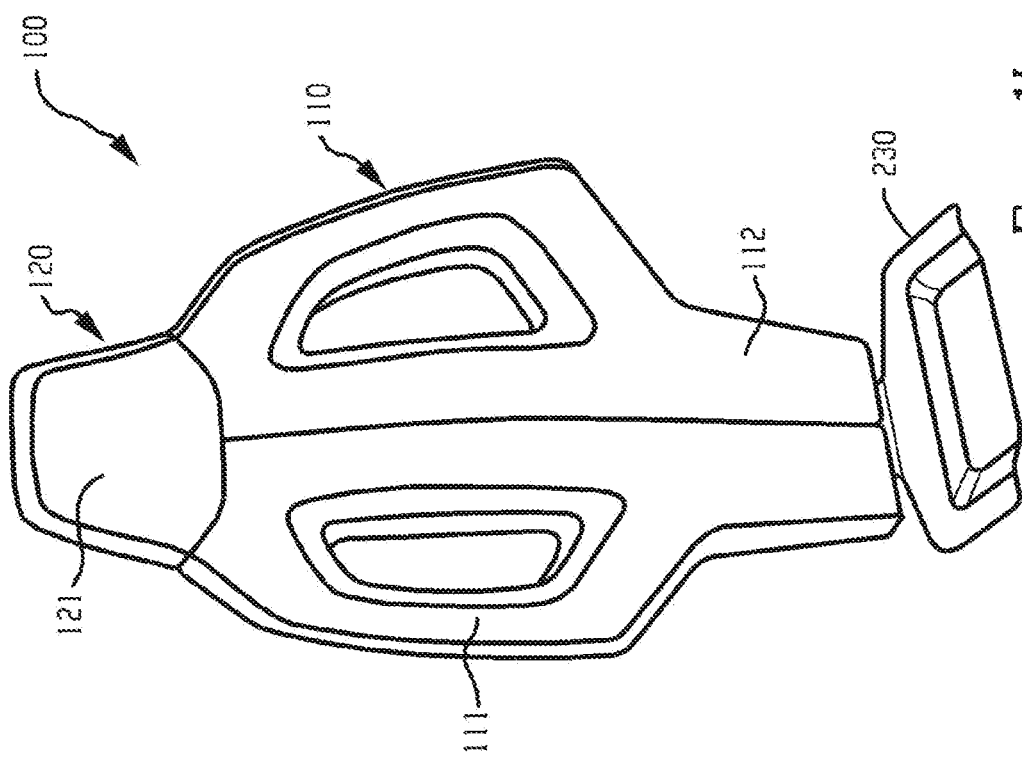
Figure 1A:
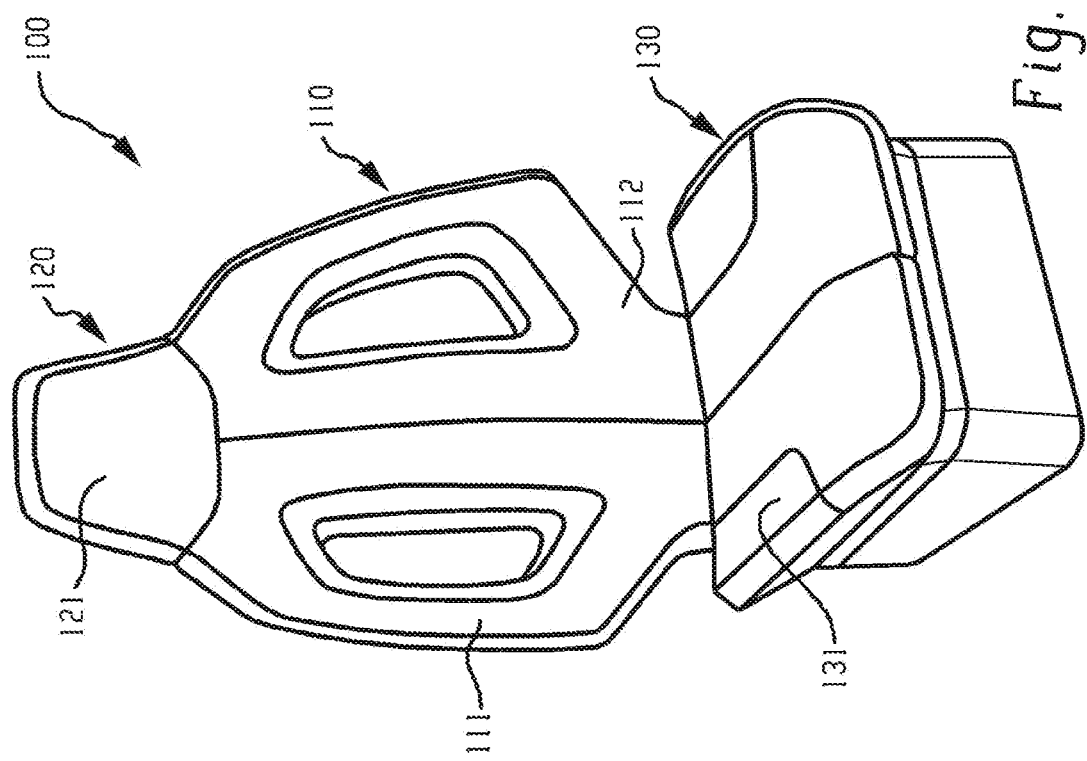
FIG. 1a shows a vehicle seat provided with a seating frame according to the invention.

A vehicle seat 100, as illustrated in FIG. 1a, can be used in electric vehicles. The seat shown in FIG. 1a is a bucket seat, i.e. a car seat contoured to hold one person, distinct from a flat bench seat designed to fit multiple people. The seat comprises a back rest 110, a head rest 120, and a seat base 130. The back rest 110 is further provided with a lumbar support 112. The back rest 110, head rest 120 and seat base 130 each may include a cushion portion 111, 121, 131, i.e. a textile cover, to provide a comfortable seat for a person. Alternatively, the supporting surfaces of the back rest 110, head rest 120 and/or seat base 130 can be made of a polymer non-textile cover, with or without a soft feel. FIG. 1b shows the back rest 110 and head rest 120 of the vehicle seat 100, without the seat base 130. The back rest 130 extends between the head rest 120 and a fastening component 230, see also FIGS. 2a and 2b.

FIGS. 2a to c shows a seating frame 200 according to the invention, indicating several regions 240, 242, 244, 246, 248. The seating frame 200 comprises a back frame component 210, a head rest component 220 and a seat frame component 230. The seating fame 200 may be made from polypropylene-long glass fiber (PP-LGF) material to fulfill mechanical performance requirements on stiffness and strength needed for an electric vehicle. The disclosed seating frame 200 can be integrated as one part and can be made using injection molding, which can reduce costs versus the traditional solution of stamping parts and mechanically assembling the parts with welding, when mass produced. The disclosed seating frame 200 can have a high performance-to-weight ratio, which can lead to weight reduction.

As shown in the FIGS. 2a to c, the seating frame 200 includes a base 202 from which a network 204 of reinforcing ribs extends towards a front of the seating frame, wherein the base 202 forms a back of the vehicle seat. The base 202 comprises a first portion 206 and a peripheral second portion 208. The peripheral second portion 208 extends at an angle greater than 0 degrees from the periphery of the first portion 206. Front and back of the vehicle seat or seating frame are related to the front and rear of a vehicle when placed in the vehicle, i.e. the back of the vehicle seat or seating frame is directed towards the rear of a vehicle when installed, and the front of the vehicle seat or seating frame is directed towards the front or hood of a vehicle when installed. The seating frame may be subjected to various bending loads upon use, which loads are applied to the top of the seating frame, i.e. at a region neighboring the head rest frame. Deflection, strength and fatigue life are consequently required for the seating frame.

To enhance the bending stiffness of the upper seating frame, stiffening structures such as reinforcement ribs, as illustrated in FIG. 2a, are added, starting from a side region 240 and ending in an upper region 242, usually located at shoulder-height of a seated person. This provides full support to resist bending in a longitudinal direction.

As further illustrated in FIG. 2a, the upper region 242 comprises a stiffening structure of reinforcement ribs that connects with the side ribbing in the side region 240. The upper region thus provides additional torsion stiffness, helping to resist torsional deformation of the seat frame in loading service.

Sufficient bending stiffness is also required in the mid region 244 of the seating frame. To achieve this, the stiffening structure comprises a network of reinforcing ribs at the mid region 244 arranged in an X-shape, thereby connecting with the upper region 242. The upper ribbing of the mid region extends downwards in a diagonal fashion from both sides, thus forming an X-shaped region 244.

FIG. 2b shows a lower region 246 of the seating frame, where the loading position is away from the lower region 246 and the main deformation is caused by bending. The straight ribbing design extending between a cross-member 250 and the fastening component 230 provides effective bending stiffness for the lower region 246 of the seating frame. A lower side ribbing 248 extending diagonally from the side regions 240 to the lower region 246 has a similar function. One cross-member 250 is designed to extend in a width direction across the seating frame 200, and is used to transfer horizontal load to neighboring ribs.

The network of ribs 204 are formed of ribs extending in a longitudinal fashion, as seen from the fastening component, as in lower region 246 and side regions 240, in a width direction, such as the cross-member or cross rib 250 in FIG. 2b, more or less located in the lumbar supporting portion 112, and diagonally extending ribs, such as in the X-shaped region 244 and upper region 242. The regions may be interconnected, i.e. form a continuous network of interconnected ribs, or form individual ribbing networks. The ribs or ribbing networks provide bending stiffness to the seating frame 100 in the plane of the base 202 of the back frame component 200.

The present methods and systems are disclosed and described above, however it is to be understood that the methods and systems are not limited to specific synthetic methods, specific components, or to particular compositions. It is also to be understood that the terminology used herein is for the purpose of describing particular examples only and is not intended to be limiting. Various combinations of elements of this disclosure are encompassed by this disclosure, e.g., combinations of elements from dependent claims that depend upon the same independent claim. Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of examples described in the specification.

The invention claimed is:

1. A seating frame for a vehicle seat, the frame comprising
a back frame component for supporting a back rest; and
a fastening component from which the back frame component extends in an upwards fashion, wherein the fastening component is used to fasten the vehicle seat to a vehicle upon installation,
wherein the back frame component includes a plurality of reinforcing ribs that form a single unit with the back frame component, and wherein the seating frame is a one-piece injection-molded part made of plastic material,
wherein the back frame component comprises an upper region, side regions, a mid region, and a lower region,
wherein the mid region comprises a network of reinforcing ribs arranged in an X-shape, and
wherein the lower region includes straight ribbing extending between a cross-member and the fastening component.

2. The seating frame according to claim 1, further comprising a seat frame component for supporting a seat base.

3. The seating frame according to claim 1, wherein the reinforcing ribs form a network of interconnected ribs.

4. The seating frame according to claim 1, wherein the back frame component comprises a base from which the reinforcing ribs extend, wherein the base forms a back of the vehicle seat.

5. The seating frame according to claim 4, wherein the base comprises a first portion and a peripheral second portion, wherein the peripheral second portion extends at an angle greater than 0 degrees from the periphery of the first portion.

6. The seating frame according to claim 1, wherein the plastic material comprises a thermoplastic material filled with fibers.

7. The seating frame according to claim 6, wherein the thermoplastic material comprises long glass fibers and wherein the long glass fibers have a length of about 3 mm to about 40 mm.

8. The seating frame according to claim 1, wherein the interconnected reinforcing ribs define cavities within the back frame component.

9. The seating frame according to claim 1, further comprising a head rest frame for a head rest, wherein the back frame component comprises a lumbar supporting portion and is attached to the head rest portion, and wherein the back frame portion is attached to the seat frame component.

10. The seating frame according to claim 1, wherein the plastic material comprises:
about 55 wt % to about 90 wt % polypropylene;
about 10 wt % to about 40 wt % long glass fiber; and
about 0.0001 wt % to about 5 wt % of one or more of an impact modifier, a filler, an antioxidant, or a reinforcing agent;
said wt % values based on the weight of the frame component.

11. A process of making the seating frame according to claim 1, the method comprising:
introducing a long glass fiber-filled polypropylene material to a hopper of an injection molding machine;
melting the long glass fiber-filled polypropylene material to form a melt in a plasticizing unit;
pressurizing the plasticizing unit of the injection molding machine with a blowing agent;
dissolving the blowing agent into the melt;
injecting the melt into a mold cavity up to 100% of volume; and
forming the frame with the back frame component and a cushion frame simultaneously.

12. A vehicle seat comprising the seating frame of claim 1.

13. The vehicle seat of claim 12, wherein the seat is a bucket seat.

14. A vehicle comprising the seating frame according to claim 1.

15. The vehicle of claim 14, wherein the plastic material comprises a thermoplastic material filled with fibers.

16. The vehicle of claim 15, wherein the fibers have a length of about 3 mm to about 40 mm.

17. The vehicle of claim 14, wherein the plastic material comprises:
about 55 wt % to about 90 wt % polypropylene;
about 10 wt % to about 40 wt % long glass fiber; and
about 0.0001 wt % to about 5 of one or more of an impact modifier, a filler, an antioxidant, or a reinforcing agent;
said wt % values based on the weight of the frame component.

18. The vehicle of claim 14, further comprising a head rest frame for a head rest, wherein the back frame component comprises a lumbar supporting portion and is attached to the head rest portion, and wherein the back frame portion is attached to the seat frame component.

19. The seating frame according to claim 1, further comprising
a seat frame component for supporting a seat base; and
wherein the seat base is supported by and/or fastened to the fastening component.

* * * * *